(12) United States Patent
Nojima et al.

(10) Patent No.: US 8,068,180 B2
(45) Date of Patent: Nov. 29, 2011

(54) AV PROCESSOR AND PROGRAM

(75) Inventors: Yoshitaka Nojima, Saitama (JP); Kazuo Ishikawa, Saitama (JP); Toru Ebata, Saitama (JP)

(73) Assignee: Pioneer Corporation, Tokyo (JP)

( * ) Notice: Subject to any disclaimer, the term of this patent is extended or adjusted under 35 U.S.C. 154(b) by 496 days.

(21) Appl. No.: 12/282,260

(22) PCT Filed: Feb. 26, 2007

(86) PCT No.: PCT/JP2007/053520
§ 371 (c)(1),
(2), (4) Date: Dec. 8, 2008

(87) PCT Pub. No.: WO2007/113951
PCT Pub. Date: Oct. 11, 2007

(65) Prior Publication Data
US 2009/0303389 A1    Dec. 10, 2009

(30) Foreign Application Priority Data

Mar. 30, 2006 (JP) ................................ 2006-095136

(51) Int. Cl.
*H04N 9/74* (2006.01)
*H04N 9/76* (2006.01)
*H04N 9/67* (2006.01)
*H04N 5/268* (2006.01)

(52) U.S. Cl. ......... 348/584; 348/598; 348/659; 348/706

(58) Field of Classification Search .................. 348/584, 348/722, 598, 705, 706, 659; 381/119, 123; *H04N 9/74, 9/76, 9/67, 5/268, 5/222*
See application file for complete search history.

(56) References Cited

U.S. PATENT DOCUMENTS 5,636,073 A    6/1997  Yamamoto et al.
6,215,914 B1 *  4/2001  Nakamura et al. ............ 348/584

FOREIGN PATENT DOCUMENTS

| JP | 62-90088 | 4/1987 |
|---|---|---|
| JP | 3-102982 | 4/1991 |
| JP | 6-86160 | 3/1994 |
| JP | 9-185376 | 7/1997 |
| JP | 2000-92391 | 3/2000 |

* cited by examiner

*Primary Examiner* — Sherrie Hsia
(74) *Attorney, Agent, or Firm* — Young & Thompson

(57) ABSTRACT

The present invention is directed to provide an AV processing device and the like that allow mixing three or more AV signals through easy operation. According to the invention, an AV processing device 30 includes an input unit 310 inputting three or more AV signals that are audio signals or video signals, a coordinate point assigning unit 322 assigning a given coordinate point in a predetermined two-dimensional region in which a coordinate axis for each input AV signal indicating its mixing rate from minimum to maximum is virtually assigned, a mixing rate calculator 331 calculating the mixing rate of each AV signal based on the coordinate axis for the AV signal and the assigned coordinate point, a mixed AV signal generator 332 generating mixed AV signals based on the calculated mixing rate of each AV signal, and an output unit 350 outputting the generated mixed AV signals.

15 Claims, 9 Drawing Sheets

FIG. 4A

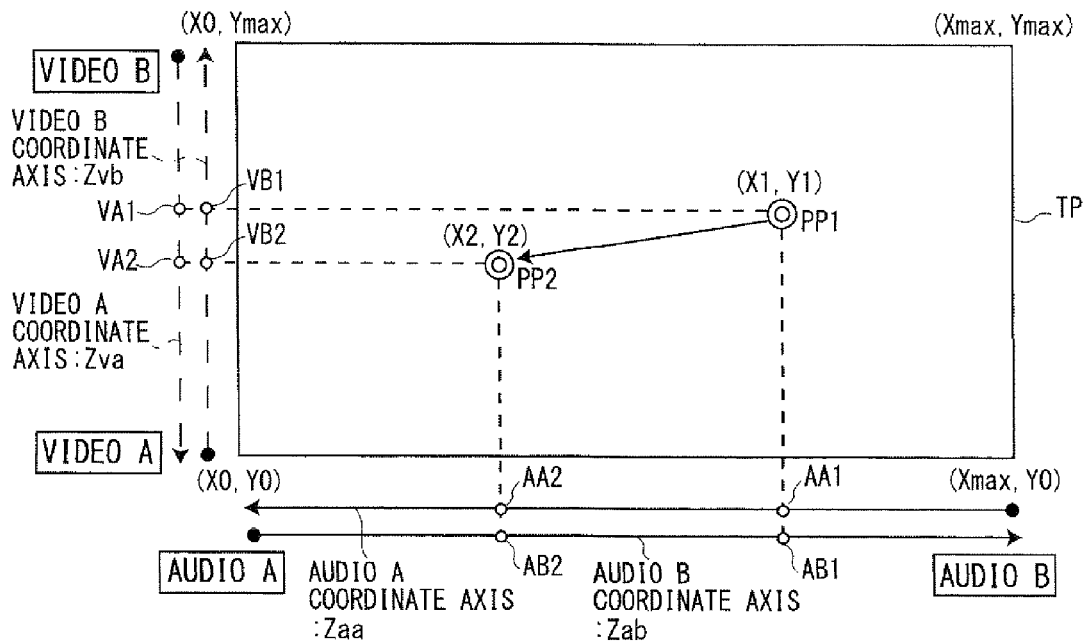

FIG. 4B

AT PRESS POINT WITH COORDINATES (X1, Y1)

$$\begin{cases} AA1 : \text{MIXING RATE OF AUDIO SIGNAL A} : \{(Xmax-X1)/Xmax\}*100 \\ AB1 : \text{MIXING RATE OF AUDIO SIGNAL B} : (X1/Xmax)*100 \\ VA1 : \text{MIXING RATE OF VIDEO SIGNAL A} : \{(Ymax-Y1)/Ymax\}*100 \\ VB1 : \text{MIXING RATE OF VIDEO SIGNAL B} : (Y1/Ymax)*100 \end{cases}$$

FIG. 4C

AT PRESS POINT WITH COORDINATES (X2, Y2)

$$\begin{cases} AA2 : \text{MIXING RATE OF AUDIO SIGNAL A} : \{(Xmax-X2)/Xmax\}*100 \\ AB2 : \text{MIXING RATE OF AUDIO SIGNAL B} : (X2/Xmax)*100 \\ VA2 : \text{MIXING RATE OF VIDEO SIGNAL A} : \{(Ymax-Y2)/Ymax\}*100 \\ VB2 : \text{MIXING RATE OF VIDEO SIGNAL B} : (Y2/Ymax)*100 \end{cases}$$

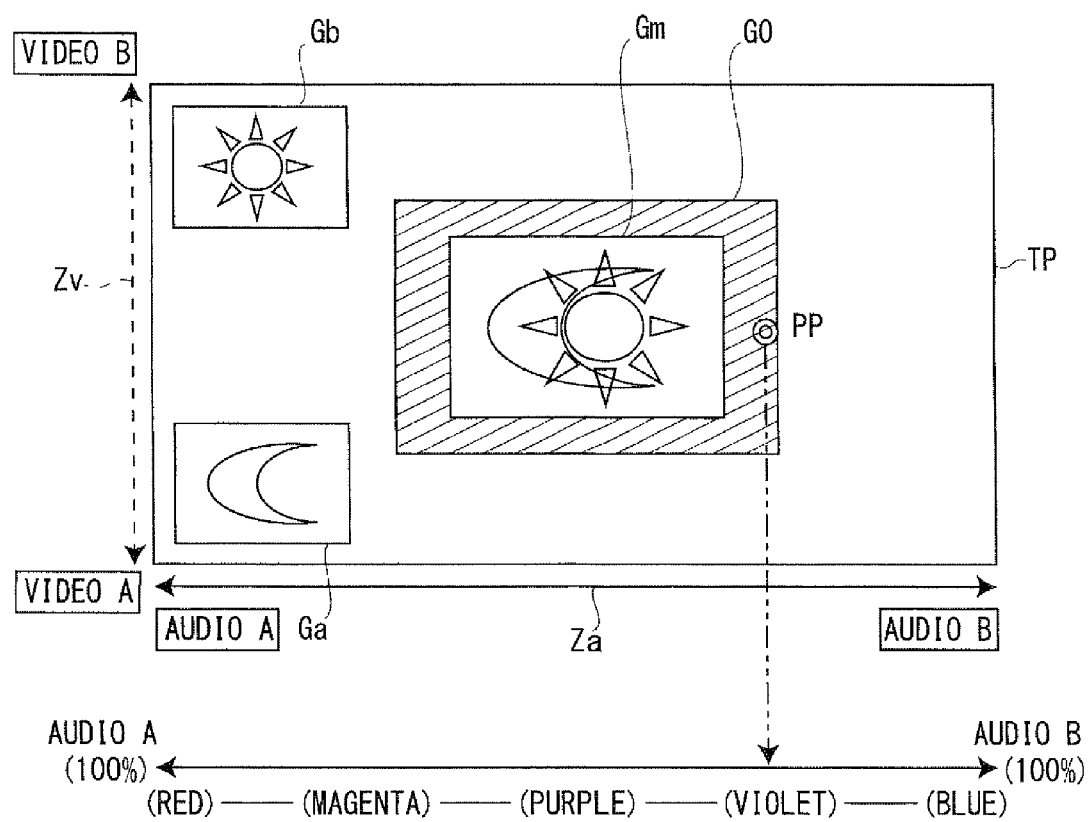
F I G. 6

AV PROCESSOR AND PROGRAM

TECHNICAL FIELD

The present invention relates to an audio and visual (AV) processing device and program that input a plurality of AV signals that are audio signals or video signals and output mixes of such AV signals, i.e., mixed AV signals.

BACKGROUND ART

In recent years, audio signal control devices that control two audio signals simultaneously with a sliding member sliding between both ends A and B of a sliding range have been known (e.g., Patent Document 1). Such audio signal control devices are generally called "crossfaders"; the volume of a first sound increases as the sliding member slides from the end A to the end B; on the contrary, the volume of a second sound increases as the sliding member slides from the end B to the end A. In other words, the mixing rate of two audio signals may be determined with one interface according to the position of the sliding member. Especially, often applied in DJ equipment (equipment used by disc jockeys [DJs] for acoustic performances) that is used in clubs or other venues, such audio signal control devices are expected to be easier to operate.

[Patent Document 1] JP-A-2004-005987

On the other hand, such audio signal control devices are applied to video signals nowadays; control devices that are capable of determining the mixing rates of two video signals with one interface are also known. Often applied in VJ equipment (equipment used by visual or video jockeys [VJs] for video performances) that is used to display diversified video images on monitors in clubs or other venues, such video signal control devices are expected to be easier to operate as well as such DJ equipment.

DISCLOSURE OF THE INVENTION

Problems to be Solved

No devices that are capable of determining the mixing rates of three or more audio signals or three or more video signals with one interface, however, have ever existed. No devices that are capable of determining with one interface the mixing rates of three audio and video signals (hereinafter called "AV signals"), such as two or more audio signals and one video signal, have ever existed, either. In short, complicated operations, such as operations of three independent faders, have been required to obtain mixed AV signals that are mixes of three or more AV signals. Accordingly, such DJ and VJ equipment as described above lacks operability and causes considerable inconvenience in occasions that require various operations in a short time.

In view of the above-described problems, an object of the present invention is to provide an AV processing device and program that allow mixing three or more AV signals through easy operation.

Means to Solve the Problems

An audio and visual (AV) processing device according to the invention includes: an input unit inputting a number l (the number l is an integer that is the addition of the number m and number n, and is greater than or equal to three) of AV signals that include a number m (the number m is an integer that is greater than or equal to zero) of audio signals and a number n (the number n is an integer that is greater than or equal to zero) of video signals; a coordinate point assigning unit assigning a given coordinate point in a predetermined two-dimensional region in which one coordinate axis for one of the number l of input AV signals indicating mixing rates of the AV signals from minimum to maximum is virtually assigned independently with one another; a mixing rate calculator calculating the mixing rate of each AV signals independently with one another based on the coordinate axis for the AV signal and the assigned coordinate point; a mixed AV signal generator generating, based on the calculated mixing rate of each AV signal, a mixed AV signal that is a mix of the number m of audio signals and the number n of video signals; and an output unit outputting the generated mixed AV signal.

With this configuration, the mixing rates of the number l of AV signals are determined with a given coordinate point assigned in a predetermined two-dimensional region in which the coordinate axes for the number l of (three or more) AV signals are virtually assigned. Accordingly, three or more AV signals can be mixed through easy operation. When a coordinate point (0, 0) is assigned in a two-dimensional region in which a first coordinate axis indicating a first audio signal from minimum to maximum and a second coordinate axis indicating a second audio signal from maximum to minimum are assigned along the X axis (beginning with zero and ending with maximum), and a third coordinate axis indicating a first video signal from minimum to maximum and a forth coordinate axis indicating a second video signal from maximum to minimum are assigned along the Y axis (beginning with zero and ending with maximum), for example, the second audio signal and the second video signal in a mixed AV signal reach the maximum.

It is preferable that the AV processing device also include a coordinate axis setting unit setting the number l of coordinate axes independently with one another which are assigned in the predetermined two-dimensional region based on the setting by the coordinate axis setting unit.

With this configuration, the number l of coordinate axes are set independently with one another according to users' preference or the number of AV signals; and the number l of coordinate axes are assigned in the predetermined two-dimensional region based on the setting. When two audio signals and two video signals are input as described above, for example, coordinate axes of two audio signals may be set in a positive and a negative directions along the X axis and further coordinate axes of two video signals may be set in a positive and a negative directions along the Y axis, or each coordinate axes may be set along a diagonal of the rectangular region in place of the X axis and the Y axis.

In the AV processing device, it is preferable that the number l of coordinate axes be assigned in such a manner that at least two of the coordinate axes coincide at the ends thereof.

With this configuration, users can recognize mixing rates more easily and sensuously because the coordinate axes coincide at the ends theirof. Especially, when the coordinate axes coincide at their both ends, it is much easier to recognize mixing rates. (When the first coordinate axis indicating the first audio signal from minimum to maximum and the second coordinate axis indicating the second audio signal from maximum to minimum are assigned along the X axis (beginning with zero and ending with maximum), for example, the coincidence of the coordinate axes at their both ends results in the coincidence between the minimum of the first audio signal and the maximum of the second audio signal and the coincidence between the maximum of the first audio signal and the minimum of the second audio signal.)

In the AV processing device, it is preferable that the number 1 of coordinate axes be assigned in such a manner that merely one coordinate point needs to be assigned by the coordinate point assigning unit.

With this configuration, the mixing rates of the number 1 of AV signals are determined through the easy operation of assigning merely one coordinate point.

It is preferable that the AV processing device also include a coordinate point display unit displaying the coordinate point assigned by the coordinate point assigning unit.

With this configuration, a user can confirm the coordinate point assigned by himself. The coordinate point may be displayed as a sign showing the point itself or in numerical values.

In the AV processing device, it is preferable that the coordinate point assigning unit assigns a coordinate point with a given point pressed in the predetermined two-dimensional region provided on a touch screen and that the coordinate point display unit display the coordinate point corresponding to the press point on the touch screen.

Since the predetermined two-dimensional region is provided on the touch screen with this configuration, the shape of the two-dimensional region may be flexibly selected. A coordinate point may be more easily assigned with the touch screen pressed at a given point. The display of the coordinate point corresponding to the press point on the touch screen shows users the coordinate point more clearly.

It is preferable that the AV processing device also include a video image display unit that displays video images carried by the video signal corresponding to the coordinate axis near the end of the coordinate axis indicating the maximum on the touch screen when the AV signal is a video signal.

With this configuration, the video images carried by the video signal corresponding to the coordinate axis are displayed near the end of the coordinate axis indicating the maximum; since a coordinate point closer to the video image is assigned, the mixing rate of the video signal becomes higher. Accordingly, users can expect to a certain degree by visually confirming the displayed video images what images the mixed AV signal will be output as.

It is preferable that the AV processing device also include a mixing rate display unit displaying mixing rates calculated by the mixing rate calculator.

With this configuration, a user can confirm the mixing rate of each AV signal for himself. The mixing rate may be displayed as an image, such as an image of a fader, or in numerical values.

It is preferable that the mixing rate display unit included in the AV processing device display the mixing rates on the touch screen using a mix of colors assigned to the respective AV signals.

With this configuration, users can confirm the mixing rate of each AV signal sensuously because the mixing rate is displayed using a mix of colors assigned to the respective AV signals. Since the mix of the colors is displayed on the touch screen that allows assigning a coordinate point, the mixing rate display unit does not require a special configuration.

It is preferable that the AV processing device also include a mixed video image display unit displaying on the touch screen mixed video images carried by mixed video signals that are a mix of the number n of video signals.

Including the mixed video image display unit, this configuration allows confirming output video images without using a monitor or the like. Since mixed video images are displayed on the touch screen that allows assigning a coordinate point, the mixed video image display unit does not require a special configuration.

It is preferable that the input unit included in the AV processing device input at least two audio signals and two video signals for AV signals.

With this configuration, a mixed AV signal that is a mix of at least two audio signals and two video signals are obtained.

A program according to the invention features the capability of causing a computer to function as each unit included in the AV processing device.

Using the program, an AV processing device that is capable of mixing three or more AV signals through easy operation is realized.

BRIEF DESCRIPTION OF THE DRAWINGS

FIG. 4 is a diagram showing the setting and placement of coordinate axes.

FIG. 6 is a diagram showing an example of a display on a touch screen.

REFERENCE NUMERALS

Figure 1A:
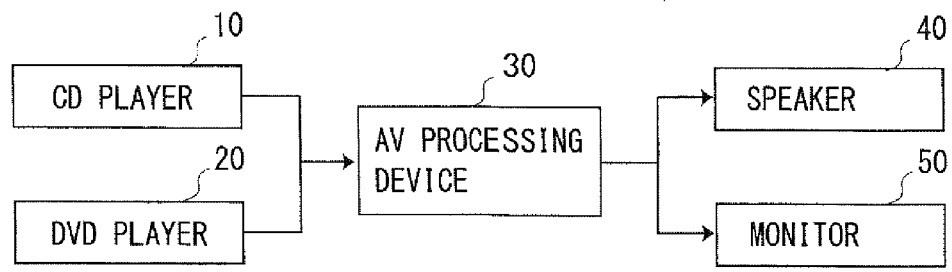
FIG. 1 shows a system configuration of an AV processing system according to one embodiment of the invention.

10 CD player
20 DVD player
30 AV processing device
31 CPU
32 mixing device
40 speaker
50 monitor
61-62 coordinate axis setting button
63 display
64 change button
SY AV processing system
TP touch screen
Z coordinate axis
Za audio coordinate axis
Zv video coordinate axis

BEST MODES FOR CARRYING OUT THE INVENTION

An AV processing device and program according to an embodiment of the invention will hereinafter be described in detail with reference to the accompanying drawings. FIG. 1A is a system configuration diagram of an AV processing system SY in which an AV processing device 30 according to the invention is applied. The AV processing system SY includes one or more CD players 10 (only one shown in the figure) generating one or more audio signals to be input to the AV processing device 30, one or more DVD players 20 (only one shown in the figure) generating one or more video signals to be input to the AV processing device 30, the AV processing device 30 receiving one or more audio signals and/or one or more video signals from one or more CD players 10 and/or one or more DVD players 20, and generating mixes of such audio and video signals respectively, i.e., mixed audio and/or video signals, a speaker 40 outputting for audio sounds mixed audio signals output from the AV processing device 30, and a monitor 50 displaying mixed video signals output from the AV processing device 30.

The AV processing device 30 according to the embodiment allows inputting three or more audio and video signals altogether. An example of the AV processing device 30 is DVJ equipment (equipment that is a combination of DJ equipment used by disc jockeys [DJs] for acoustic performances and VJ equipment used by visual or video jockeys [VJs] for video performances) that is used in clubs or other venues and allows processing audio and/or video signals (hereinafter called "AV signals") as doing so on a musical instrument when applying effects on both audio sounds and video images, for instance.

VJs and DJs will be described hereinafter. VJs mix (composite or concatenate) video images along with music impromptu. While DJs mix music impromptu, VJs give a performance using video images. The job of VJs is to give a performance of outputting one video image after another on screens or the like mainly in events or club parties, and to select extempore and display with good timing video images suitable for music played in the venues or activities in progress.

On the other hand, DJs select music suitable for the atmosphere of the venues, provide a seamless playback, and give a live performance using such equipment as turntables that are capable of changing music pitch (speed). Generally, DJs not only select music but also give a performance, such as DJ mixing and scratching. In mixing, a piece of music that is being played concatenates smoothly with another that is going to be played, resulting in no sound gap and keeping the mood on the floor rising.

In general, most performers are currently compartmentalized into VJs or DJs, specializing in a performance on either music or video images. It is difficult for those specializing in a performance on either music or video images to mix objects that are not their specialty. Even in a performance on either music or video images, a variety of very hasty operations are required to give an impromptu performance and apply effects. This situation does not allow processing both music and video images.

Both VJs and DJs, however, carry out such activities as outputting one piece of music or video image after another at a good tempo to match the atmosphere of the venues or the performers' sense. Since it is necessary to harmonize the sounds to be provided with the video images to be provided, it is desirable that one person give both audio and video performances. VJs who essentially specialize in video performances may easily process music if music changes with the change of video images; on the contrary, DJs who essentially specialize in music may process sounds and video images altogether in a more spontaneous manner if video images change with the change of sounds.

The AV processing device 30 according to the embodiment enables one person to process both video images and music that are essentially impossible for one person to process simultaneously. The AV processing device 30 also provides easy and comfortable operability to those who try to process both music and video images.

For devices generating AV signals to be input to the AV processing device 30, other devices but CD players 10 and DVD players 20 (e.g., various types of audio and video equipment, personal computers) may be used. The functions of CD players 10 and DVD players 20 may be included in the AV processing device 30. Video signals may be moving images or still images. When a plurality of audio signals are input to the AV processing device 30, the CD players 10 or AV processing device 30 should have a function to equalize the beats per minute (BPM) of such a plurality of audio signals.

Figure 1B:
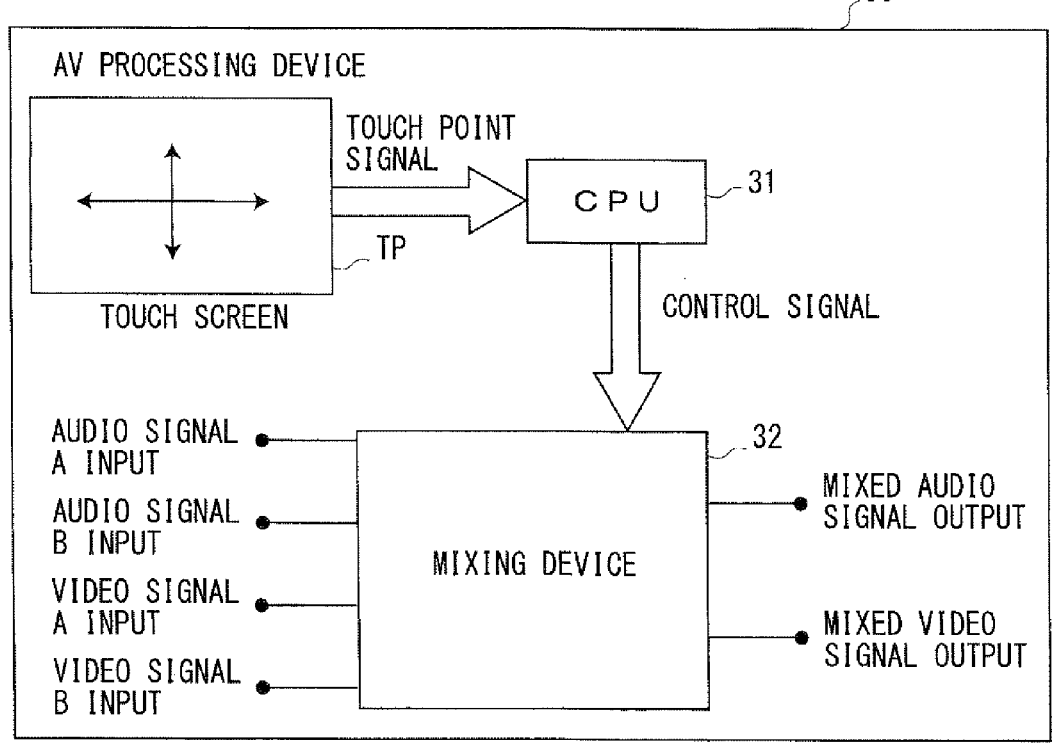

FIG. 1B is a schematic configuration diagram of the AV processing device 30. The following description will be provided assuming that two audio signals (audio signals A and B) and two video signals (video signals A and B) are input for AV signals. The AV processing device 30 includes such main components as a touch screen TP, a CPU 31 and a mixing device 32.

The touch screen TP allows a user to assign the mixing rate of each AV signal input to the AV processing device 30. The CPU 31 generates and outputs to the mixing device 32 (audio-video control device) a control signal to specify the mixes of the AV signals based on a touch point signal generated according to a press point on the touch screen TP. The CPU 31 also exercises supervision control over the AV processing device 30, such as information management based on user operations, and signal inputs and outputs to or from external devices.

The mixing device 32, based on the control signal input from the CPU 31, calculates the mixing rate of each input AV signal. The mixing device 32, based on the calculated mixing rates, also generates and outputs from each output interface mixed audio signals and mixed video signals that are mixes of the audio signal A and audio signal B, and the video signal A and video signal B respectively.

Figure 2:
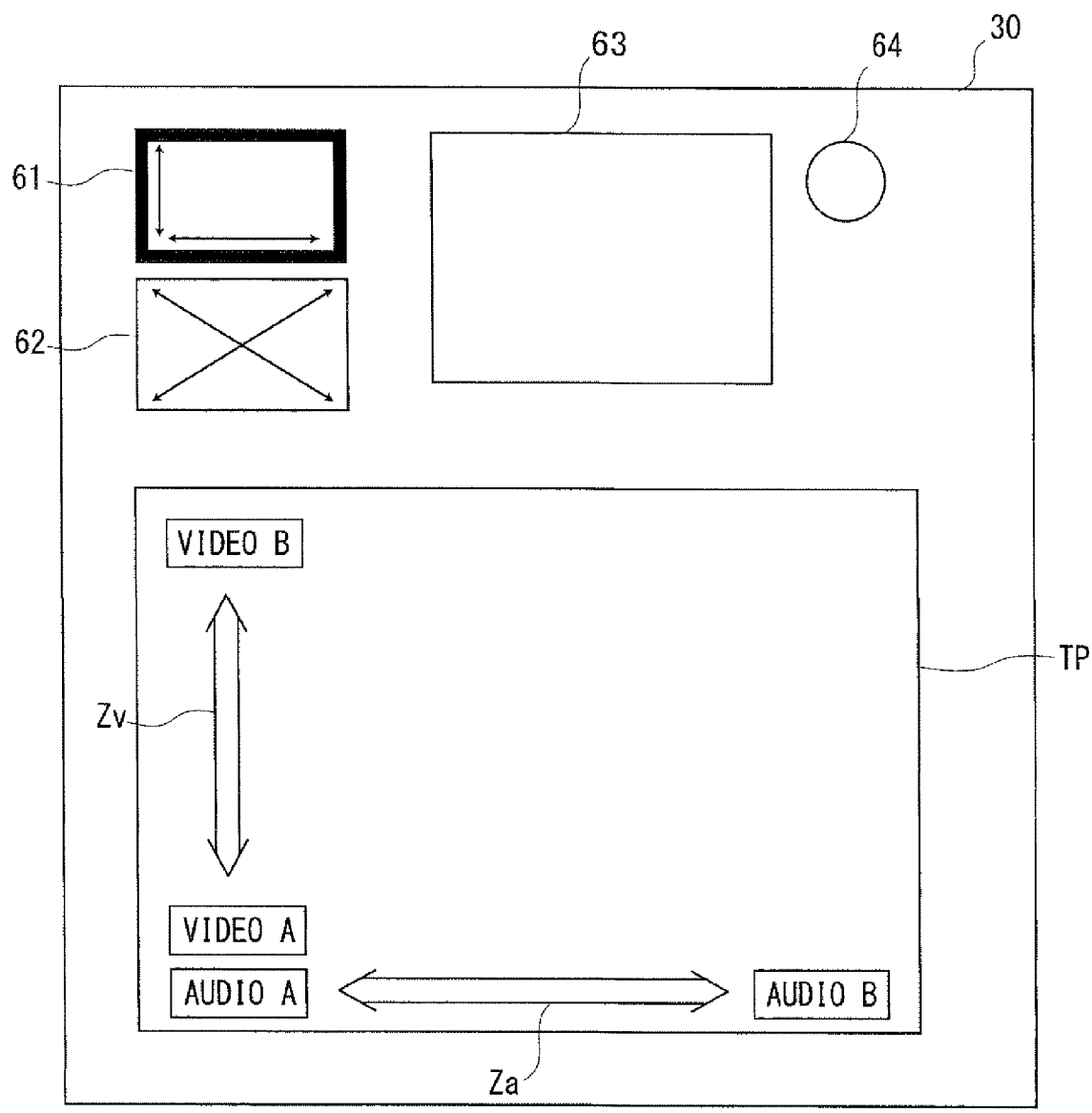
FIG. 2 is a diagram showing a user interface included in an AV processing device.

Referring to the plane view shown in FIG. 2, a user interface included in the AV processing device 30 will be described hereinafter. As shown in the figure, the AV processing device 30 has on the top of its enclosure the above touch screen TP, coordinate axis setting buttons 61 and 62 setting the placement of coordinate axes Z on the touch screen TP, a display 63 displaying mixed video signals and the like, and a change button 64 changing the association between coordinate axes Z and AV signals.

The touch screen TP is used to assign a mixing rate of each AV signal and also used to display various types of information (e.g., touch points pressed by a user, coordinate axes Z, video images carried by input video signals, a mixing rate of each AV signal, video images carried by generated mixed video signals).

The touch screen TP shown in the figure displays the placement of coordinate axes Z that are virtually assigned on the touch screen TP with the press of the coordinate axis setting button 61. According to the placement, an audio coordinate axis Za used as a reference for determination of the mixing rates of the audio signal A (Audio A) and audio signal B (Audio B) is assigned in the horizontal direction (X-axis direction). The audio coordinate axis Za indicates that the mixing rate of the audio signal B becomes higher as the touch screen TP is touched at more rightward a point and that the mixing rate of the audio signal A becomes higher as the touch screen TP is touched at more leftward a point. An video coordinate axis Zv used as a reference for determination of the mixing rates of the video signal A (Video A) and video signal B (Video B) is also assigned in the vertical direction (Y-axis direction). The video coordinate axis Zv indicates that the mixing rate of the video signal B becomes higher as the touch screen TP is touched at more upward a point and that the mixing rate of the video signal A becomes higher as the touch screen TP is touched at more downward a point.

With the press of the coordinate axis setting button 62, the audio coordinate axis Za is assigned in such a manner that the mixing rate of the audio signal A becomes higher as the touch screen TP is touched further to the lower right and that the mixing rate of the audio signal B becomes higher as the touch screen TP is touched further to the upper left. The video coordinate axis Zv is assigned in such a manner that the mixing rate of the video signal A becomes higher as the touch screen TP is touched further to the lower left and that the mixing rate of the video signal B becomes higher as the touch screen TP is touched further to the upper right (referring to FIG. 5 for both). This means a user may set the placement of coordinate axes Z on the touch screen TP by pressing either of the two coordinate axis setting buttons 62 according to their preference or for ease of use. The setting and placement of each coordinate axis Z will be described in detail below. The display of coordinate axes Z on the touch screen TP has the option to toggle the display through user operation.

The display 63 is used to display the coordinates (numerical values) of a press point touched by a user and to display the mixing rate of each AV signal in numerical values, i.e., percentages. With a display switching button that is not shown pressed, the display 63 is also capable of displaying video images based on input video signals or generated mixed video signals and other information.

The change button 64 is pressed in order to change the association between coordinate axes Z and AV signals. In the shown situation, for example, the audio coordinate axis Za indicates the maximum of the audio signal B at the right end and the maximum of the audio signal A at the left end; the press of the change button 64 allows switching the points at which the audio signal A and audio signal B reach the maximum. Another press of the change button 64 allows switching the points at which the video signal A and video signal B reach the maximum. Yet another press of the change button 64 allows switching the positions of the audio coordinate axis Za and video coordinate axis Zb. The press of the coordinate axis setting button 62 also allows changing the association between coordinate axes Z and AV signals.

Figure 3:
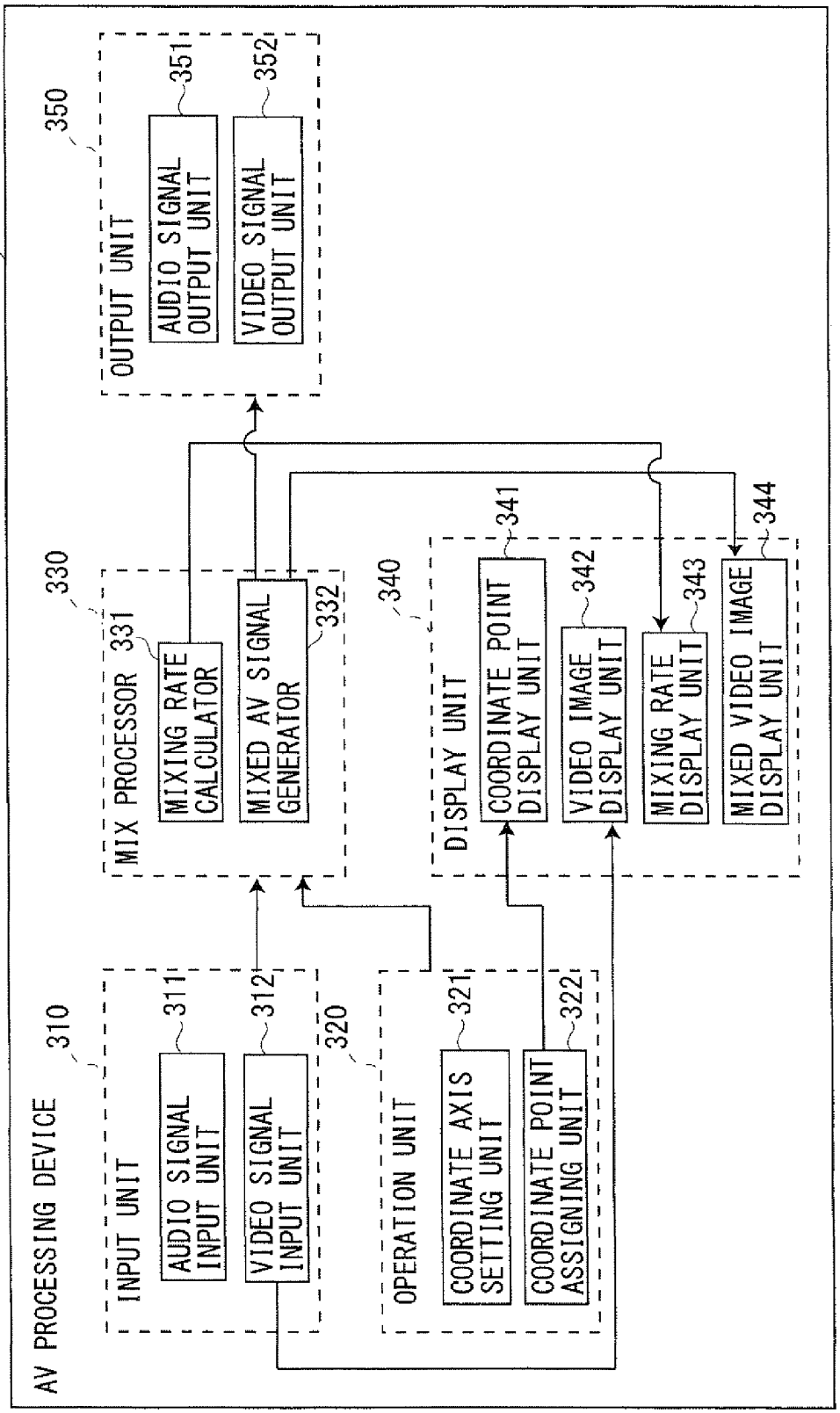
FIG. 3 is a block diagram of an AV processing device.

Referring to the block diagram shown in FIG. 3, the control configuration of the AV processing device 30 will be described hereinafter. As shown in the figure, the AV processing device 30 includes an input unit 310, an operation unit 320, a mix processor 330, a display unit 340 and an output unit 350.

The main part of the input unit 310 and output unit 350 is formed of video signal input and output interfaces (e.g., USBs, MIDIs) and the like. The main part of the operation unit 320 is formed of the above touch screen TP, coordinate axis setting buttons 61 and 62, and change button 64 (shown in the FIG. 2). The main part of the mix processor 330 is formed of the CPU 22 and mixing device 32. The main part of the display unit 340 is formed of the CPU 22, touch screen TP and display 63 (shown in FIG. 2).

The input unit 310 includes an audio signal input unit 311 and a video signal output unit 312. The audio signal input unit 311 inputs a number m (the number m is an integer that is greater than or equal to zero) of audio signals; the video signal input unit 312 inputs a number n (the number n is an integer that is greater than or equal to zero) of video signals. The input unit 310 inputs a number l (the number l is an integer that is the addition of the number m and number n, and is greater than or equal to three) of AV signals including the number m of audio signals and the number n of video signals.

The operation unit 320 includes a coordinate axis setting unit 321 and a coordinate point assigning unit 322. The coordinate axis setting unit 321 allows a user to set the placement (assignment) of coordinate axes Z using the coordinate axis setting buttons 61 and 62. In order to set coordinate axes Z, not only may the coordinate axis setting buttons 61 and 62 be pressed, but the AV processing device 30 may receive a predetermined command sent from a personal computer or any other control device.

With the touch screen TP pressed by a user at a given point, the coordinate point assigning unit 322 assigns a coordinate point in a predetermined two-dimensional region covering the whole area of the touch screen TP. Although one or more press points may be applicable depending on the placement of coordinate axes Z, only one point is pressed according to the embodiment.

The mix processor 330 includes a mixing rate calculator 331 and a mixed AV signal generator 332. The mixing rate calculator 331 calculates the mixing rate of each AV signal based on the coordinate axis Z for each AV signal set with the operation unit 320 and an assigned coordinate point. The mixed AV signal generator 332, based on the mixing rate of each AV signal calculated by the mixing rate calculator 331, generates mixed AV signals that are mixes of the two (or the number m of) audio signals and the two (or the number n of) video signals.

The display unit 340 includes a coordinate point display unit 341, a video image display unit 342, a mixing rate display unit 343 and a mixed video image display unit 344. The coordinate point display unit 341 displays a coordinate point PP (shown in FIG. 4A) corresponding to a user's press point on the touch screen TP, and also displays its coordinates (x, y) in the two-dimensional region in numerical values on the display 63 (shown in FIG. 2).

The video image display unit 342 displays video images carried by input video signals on the touch screen TP and display 63. On the touch screen TP, each video image Ga or Gb is displayed near the end of the video coordinate axis Zv for each video signal that indicates the maximum (referring to FIG. 6).

The mixing rate display unit 343 indicates the mixing rate of each audio signal near the center of the touch screen TP (in a border region G0 located around a mixed video image display region Gm) using a mix of the colors assigned to the respective audio signals (referring to FIG. 6). When the red color is assigned to the audio signal A and the blue color is assigned to the audio signal B, for example, mixing both signals at the rate of fifty percent respectively results in the display of the border region G0 in purple color. The mixing rate display unit 343 displays the mixing rate of each AV signal in numerical values, i.e., percentages on the display 63 (shown in FIG. 2).

The mixed video image display unit 344 displays on the touch screen TP and display 63 video images carried by generated mixed video signals. The touch screen TP displays video images carried by mixed video signals in the mixed video image display region Gm located around the center of the touch screen TP (referring to FIG. 6). When four audio signals are input with no video signal input, the mixed video image display region Gm indicates the mixing rates of the audio signals corresponding to the audio coordinate axis Za set in the vertical direction using a mix of the colors assigned to the respective audio signals.

The output unit 50 includes an audio signal output unit 351 and a video signal output unit 352. The audio signal output unit 351 outputs to the speaker 40 or the like mixed audio signals that are the mix of two (or the number m of) input audio signals at the calculated mixing rates. The video signal output unit 352 outputs to the monitor 50 or the like mixed video signals that are the mix of two (or the number n of) input video signals at the calculated mixing rates.

Referring to FIGS. 4 and 5, the setting and placement of coordinate axes Z will be described hereinafter. FIG. 4A shows the placement of coordinate axes Z with the coordinate axis setting button 61 pressed. Each coordinate axis Z indicates the mixing rate of each AV signal from minimum to maximum. Accordingly, four coordinate axes Z corresponding to four AV signals respectively are assigned according to the embodiment. All coordinate axes Z are assigned in a predetermined two-dimensional region that is subject to the press of users. The area of the touch screen TP according to the embodiment is considered equal to the predetermined two-dimensional region. The minimum of the mixing rate of each AV signal is zero percent; the maximum is one hundred percent.

As shown in FIG. 4A, an audio A coordinate axis Zaa indicates the audio signal A from minimum (X-coordinate: Xmax) to maximum (X-coordinate: X0); an audio B coordinate axis Zab indicates the audio signal B from minimum (X-coordinate: Xmax) to maximum (X-coordinate: X0). A video A coordinate axis Zva indicates the video signal A from minimum (X-coordinate: Ymax) to maximum (X-coordinate: Y0); a video B coordinate axis Zvb indicates the video signal B from minimum (X-coordinate: Ymax) to maximum (X-coordinate: Y0).

Accordingly, the audio A coordinate axis Zaa and audio B coordinate axis Zab coincide at the X-coordinates X0 and Xmax; the video A coordinate axis Zva and video B coordinate axis Zvb coincide at the Y-coordinates Y0 and Ymax. The audio coordinate axis Za and video coordinate axis Zv are assigned in the vertical direction. To make the illustration easier to understand, the type of each AV signal ("audio A," "audio B," "video A" and "video B") is shown near the maximum on each coordinate axis Z.

When each coordinate axis Z is assigned as described above, the mixing rate of each AV signal is as shown in FIG. 4B with a coordinate point PP1 (X1, Y1) pressed, for example. Accordingly, the mixing rates of the audio signal A and audio signal B are calculated based on the intersection points AA1 and AB1 of the perpendicular lines drawn from the coordinate point PP1 to the two audio coordinate axes Za and the audio coordinate axes Za, respectively. The mixing rates of the video signal A and video signal B are calculated based on the intersection points VA1 and VB1 of the perpendicular lines drawn from the coordinate point PP to the two video coordinate axes Zv and the video coordinate axes Zv, respectively.

As the press point is moved (dragged) from the coordinate point PP1 (X1, Y1) to a coordinate point PP2 (X2, Y2), the mixing rate of each AV signal changes as shown in FIG. 4C. Accordingly, simply moving a press point (one point) results in a gradual change in the mixing rates of the four AV signals.

Figure 5A:
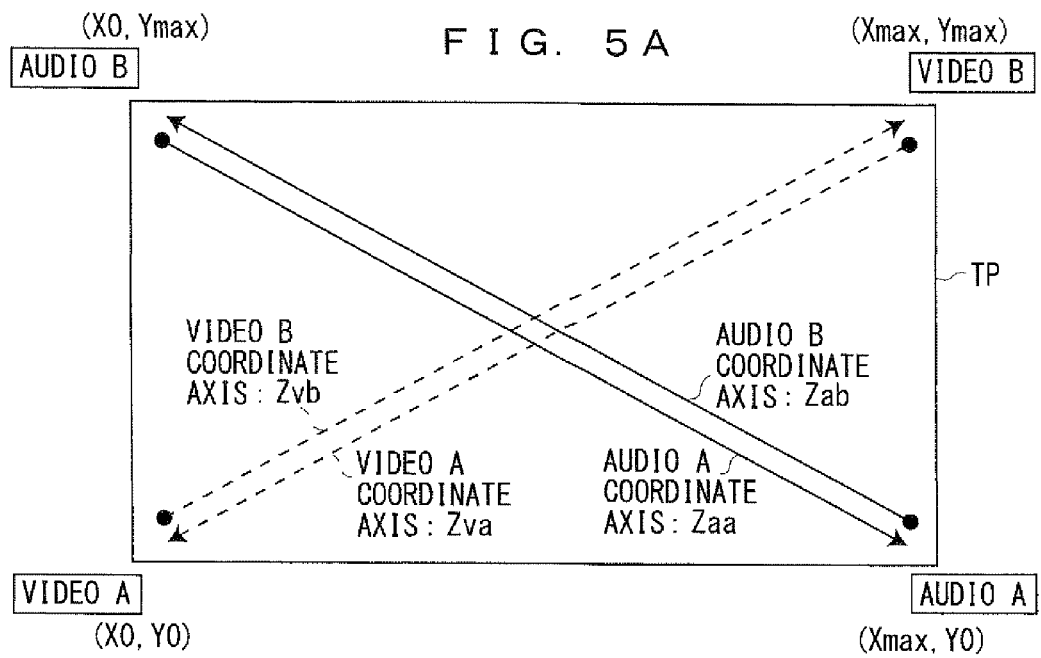
FIG. 5 includes diagrams showing the setting and placement of coordinate axes that are different from those shown in FIG. 4.

FIG. 5A shows the placement of coordinate axes Z with the coordinate axis setting button 62 pressed. In this case, an audio A coordinate axis Zaa indicates the audio signal A from minimum {coordinates (X0, Ymax)} to maximum {coordinates (Xmax, Y0)}; an audio B coordinate axis Zab indicates the audio signal B from minimum {coordinates (Xmax, Y0))} to maximum {coordinates (X0, Ymax)}. A video A coordinate axis Zva indicates the video signal A from minimum {coordinates (Xmax, Ymax)} to maximum {coordinates (X0, Y0)}; a video B coordinate axis Zvb indicates the video signal B from minimum {coordinates (X0, Y0)} to maximum {coordinates (Xmax, Ymax)}.

Accordingly, the ends of the audio A coordinate axis Zaa and audio B coordinate axis Zab coincide at the coordinates (X0, Ymax) and (Xmax, Y0); the ends of the video A coordinate axis Zva and video B coordinate axis Zvb coincide at the coordinates (Xmax, Ymax) and (X0, Y0). To make the illustration easier to understand, two coordinate axes Z that coincide at both ends are shown as one coordinate axis that is a double-headed arrow as shown in FIG. 5B.

Figure 5B:
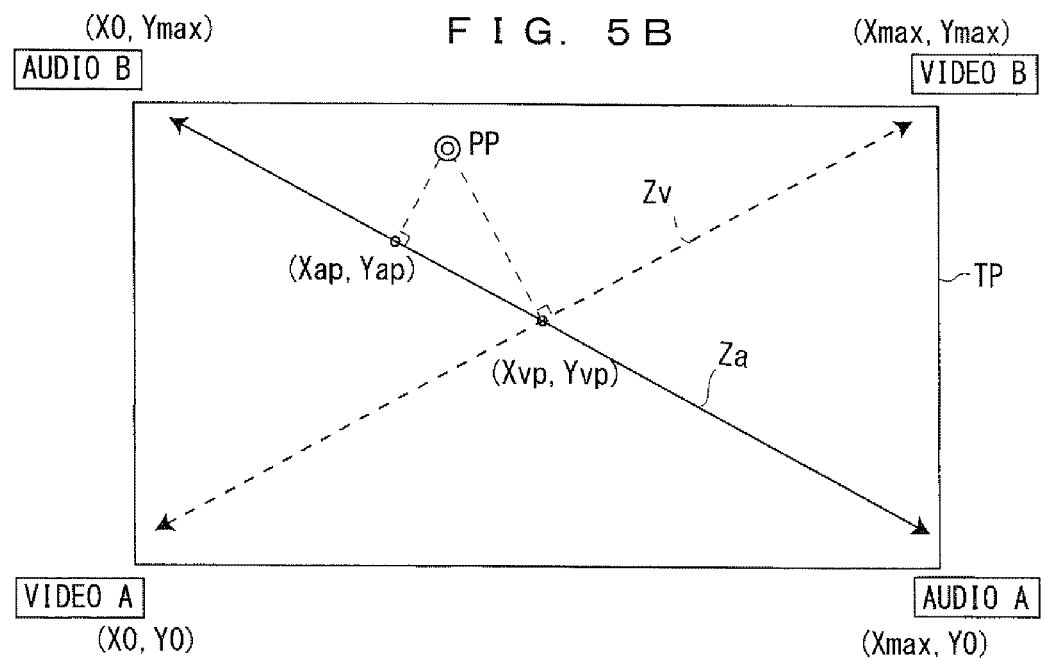

For example, with a coordinate point PP pressed as shown in FIG. 5B, the mixing rates of the four AV signals are determined based on the intersection points (Xap, Yap) and (Xvp, Yvp) of the perpendicular lines drawn from the coordinate point PP to the coordinate axes Za and Zv and the coordinate axes Za and Zv, respectively. In this case, the mixing rates of the audio signal A and audio signal B are determined referring to the points (coordinates) on the coordinate axes Za that are calculated based on the coordinate point PP and a table (not shown) associating the mixing rates of the audio signal A and audio signal B. The mixing rates of the video signal A and video signal B are also determined referring to the points (coordinates) on the coordinate axes Zv that are calculated based on the coordinate point PP and a table (not shown) associating the mixing rates of the video signal A and video signal B.

Naturally, it is possible to calculate the mixing rate of each AV signal based on a formula indicating each coordinate axis Z and the coordinate point corresponding to a press point without referring to a table as described above.

Referring to FIG. 6, a display on the touch screen TP will be described hereinafter. The figure shows an example of display with the coordinate axis setting button 61 (shown in FIG. 2) pressed. Near both ends of the video coordinate axis Zv are provided a video image display region Ga that displays video images carried by the video signal A, and a video image display region Gb that displays video images carried by the video signal B, respectively, as shown in the figure. The video image display regions Ga and Gb indicate that the press of a point closer to one of the regions allows obtaining mixed video signals with a higher mixing rate of the video image that is displayed there. Accordingly, with the coordinate point PP pressed, for example, the video images carried by the mixed video signals that are the mix of the video signal A and video signal B at the rate of 50 percent each are displayed in the mixed video image display region Gm located around the center of the touch screen TP. In this case, "mixing video signals" means mixing in the fade mode. The coordinate point PP corresponding to a press point is displayed as a double circle as shown in the figure.

The mixing rates of audio signals are displayed in the border region G0 located around the mixed video image display region Gm using a mix of the colors assigned to the audio signals. When the mixing rate of the audio signal A is one hundred percent with the red color assigned to the audio signal A and the blue color assigned to the audio signal B, for example, the border region G0 is red. As the mixing rate of the audio signal B becomes higher, the color of the border region G0 changes to magenta, purple, violet and blue. Accordingly, the border region G0 is violet with the coordinate point PP pressed, for example.

According to the embodiment as described above, the mixing rates of a number 1 of (three or more) AV signals are determined with a given coordinate point pressed by merely one finger in a predetermined two-dimensional region (on the touch screen TP) in which coordinate axes Z for the number 1 of AV signals are virtually assigned.

The placement of coordinate axes Z can be changed (set) using the coordinate axis setting buttons 61 and 62 (shown in FIG. 2) according to users' preference or the numbers of AV signals. In this case, a user may recognize mixing rates more easily and sensuously because the audio coordinate axes Za and video coordinate axes Zb in any setting coincide at both ends respectively. The mixing rates of the number 1 of AV signals can be determined through the easy operation of assigning merely one coordinate point because the coordinate axes Z in any setting are assigned so that merely one coordinate point needs to be assigned.

Since the coordinate point touched by a user is displayed as a double circle on the touch screen TP (referring to FIG. 6), he can confirm the coordinate point for himself. Displayed in numerical values on the display 63 (shown in FIG. 2), the coordinate point can be confirmed on both of the touch screen TP and display 63.

Video images carried by the video signal corresponding to each audio coordinate axis Zva or Zvb are displayed in the video image display region Ga or Gb located near the end of the video coordinate axis Zv that indicates the maximum (referring to FIG. 6), which indicates that if a coordinate point is assigned closer to the video images, the mixing rate of the video signal becomes higher. The mixed video image display region Gm on the touch screen TP displays mixed video images, which allows confirming output video images without using the monitor 50 or the like.

Although the mixing rates of audio signals may not be displayed as images, the mixing rate of each audio signal is displayed in the border region G0 on the touch screen TP using a mix of the colors assigned to the audio signals respectively (referring to FIG. 6), which allows a user to sensuously confirm the mixing rate of each audio signal. Displayed in numerical values, i.e., percentages on the display 63 (shown in FIG. 2), the mixing rates can be confirmed on both of the touch screen TP and display 63.

Although the placement (assignment) of coordinate axes Z according to the above embodiment has two patterns available to be chosen (the coordinate axis setting buttons 61 and 62 shown in FIG. 2), other patterns may also be used. FIG. 7 includes diagrams showing other examples of placement of coordinate axes Z.

Figure 7A:
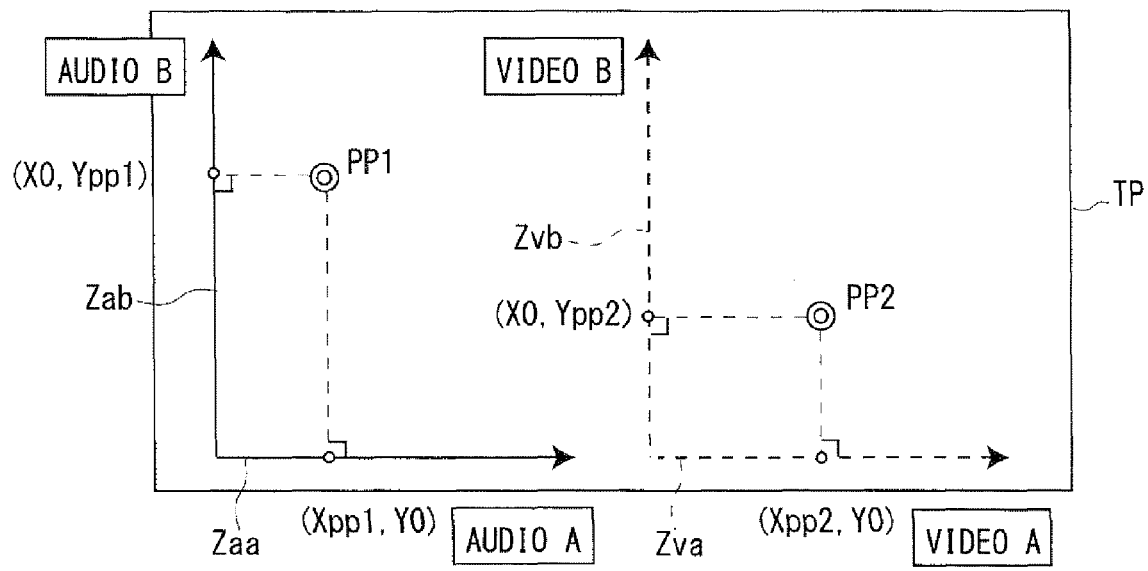
FIG. 7 includes diagrams showing examples of other placement of coordinate axes.

As shown FIG. 7A, each coordinate axis Z may be placed so that two coordinate points may be assigned. With a coordinate point PP1 pressed in this case, the mixing rates of the audio signal A and audio signal B can be obtained from the intersection points (Xpp1,Y0) and (X0,Ypp1) of the perpendicular lines drawn from the coordinate point PP1 to the audio A coordinate axis Zaa and audio B coordinate axis Zab, respectively. With a coordinate point PP2 pressed in this case, the mixing rates of the video signal A and video signal B can be obtained from the intersection points (Xpp2,Y0) and (X0,Ypp2) of the perpendicular lines drawn from the coordinate point PP2 to the video A coordinate axis Zva and video B coordinate axis Zvb, respectively.

Figure 7B:
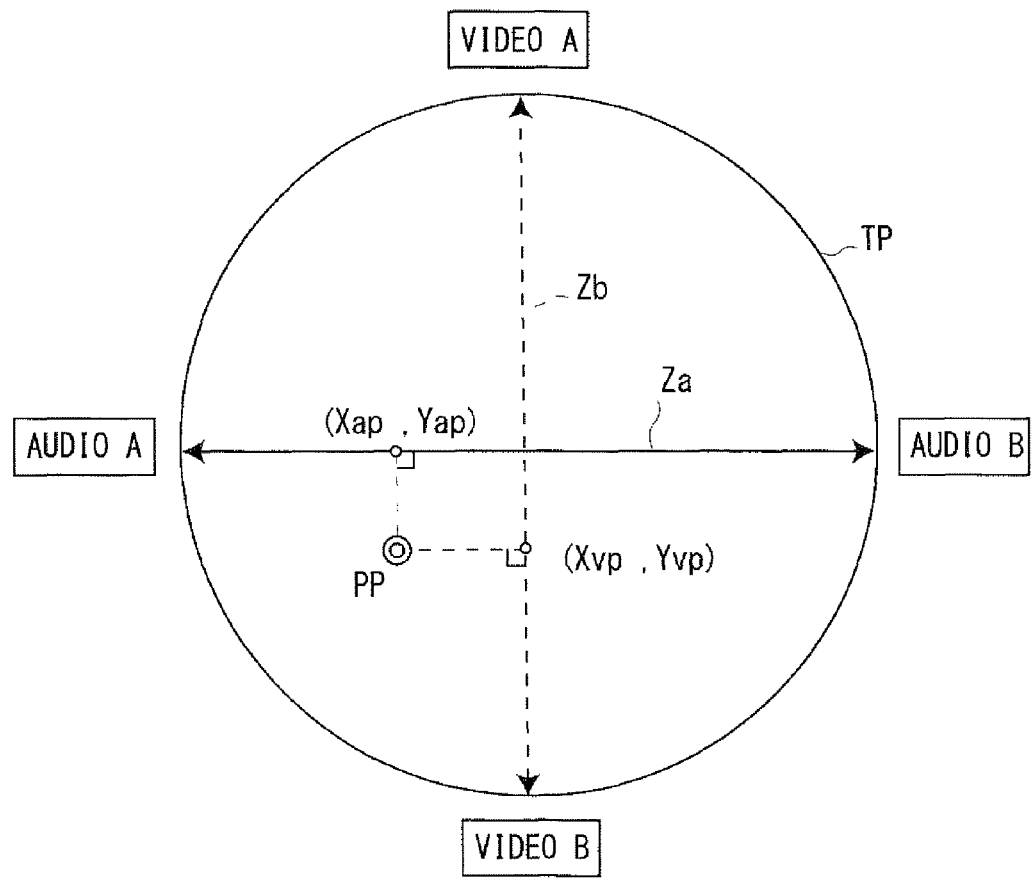

Not limited to a rectangular shape (rectangle), the shape of the touch screen TP (predetermined two-dimensional region) may be a circle as shown in the FIG. 7B. With a coordinate point PP pressed in this case, the mixing rates of the AV signals can be obtained from the intersection points (Xap, Yap) and (Xvp, Yvp) of the perpendicular lines drawn from the coordinate point PP to the audio coordinate axis Za and video coordinate axis Zv, respectively.

Any shape, such as a parallelogram, rhombus and trapezoid is also applicable to the touch screen TP. When the area of the touch screen TP is not equal to the predetermined two-dimensional region (part of the area of the touch screen TP is equal to the predetermined two-dimensional region), it is preferable that the predetermined two-dimensional region be displayed on the touch screen TP. This configuration enables a user to recognize the area in which he may assign a coordinate point. Any assignment of coordinate axes Z is applicable: for example, the minimum of each coordinate axis Z is placed at the center of the circle; the maximum of each coordinate axis Z is placed on the circumference; and all coordinate axes Z are radially assigned.

Figure 8A:
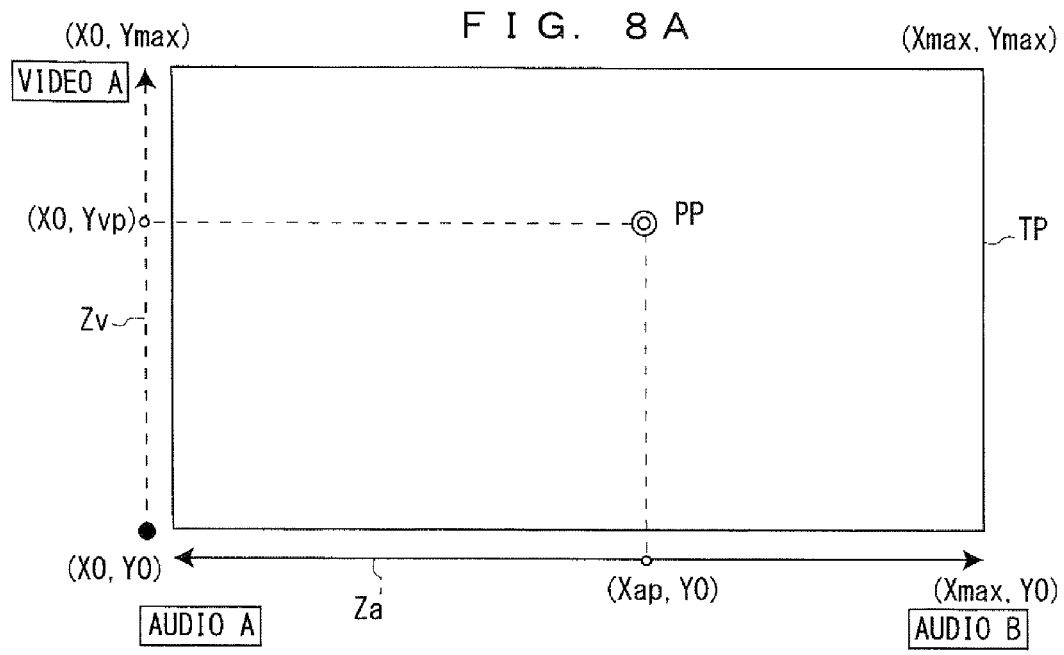
FIG. 8 includes diagrams showing an example of the placement of coordinate axes for mixing three or six AV signals.

Although the above embodiment describes mixing four AV signals that are formed of two audio signals and two video signals, any number of AV signals may be mixed. FIG. 8A shows an example of placement of coordinate axes Z for mixing three AV signals formed of two audio signals and one video signal. Although the audio coordinate axes Za are placed in the same manner as in the examples shown in FIG. 4 and other figures, the video coordinate axis Zv, unlike that of other examples, only indicates the video signal A from minimum to maximum. With a coordinate point PP pressed in this case, the mixing rate of the video signal A can be obtained from the intersection point (X0, Yvp) of the perpendicular line drawn from the coordinate point PP to the video coordinate axis Zv. Accordingly, no image is output (the monitor display displaying output video images is solidly black or transparent) when the Y coordinate of the coordinate point PP is Y0.

Figure 8B:
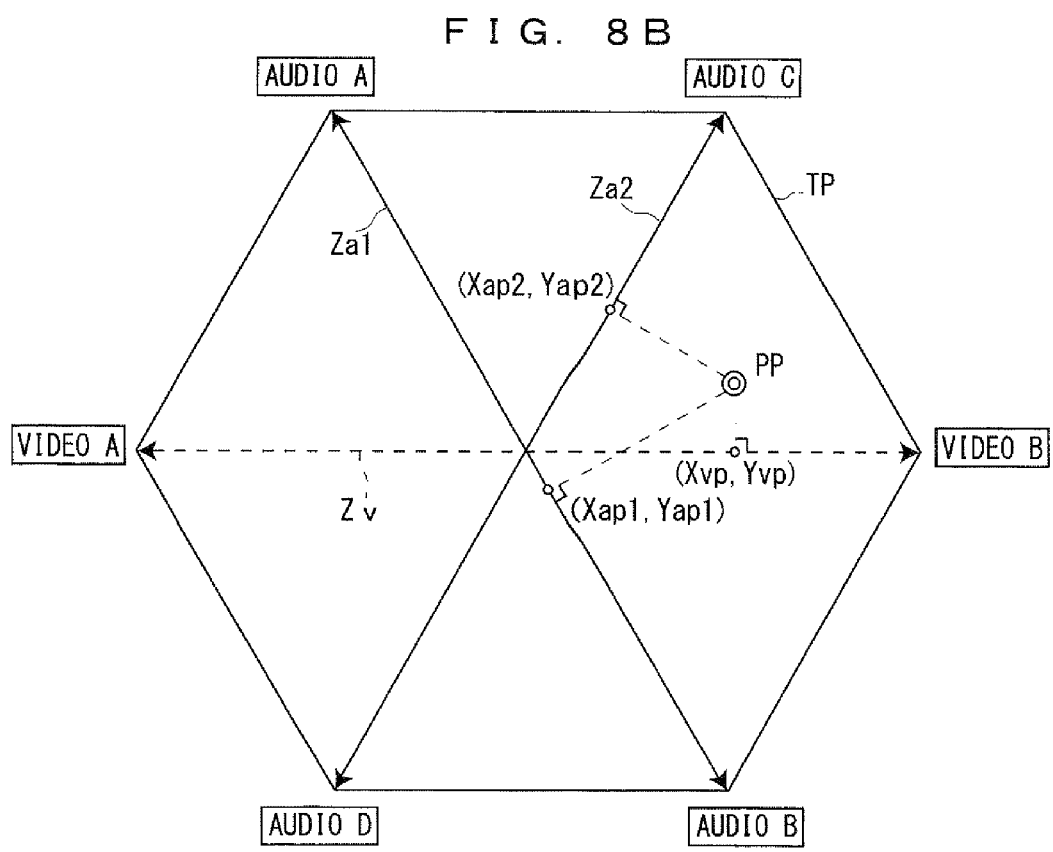

FIG. 8B shows an example of placement of coordinate axes Z for mixing six AV signals formed of four audio signals and two video signals. In this case, the area of a hexagon is a predetermined two-dimensional region; with a coordinate point PP pressed, the mixing rates of the audio signals A, B, C and D and the mixing rates of the video signals A and B can be obtained from the intersection points (Xap1,Yap1), (Xap2, Yap2) and (Xvp, Yvp) of the perpendicular lines drawn from the coordinate point PP to the coordinate axis Za1 for the audio signals A and B, the coordinate axis Za2 for the audio signals C and D and the coordinate axis Zv for the audio signals A and B, respectively.

Figure 9A:
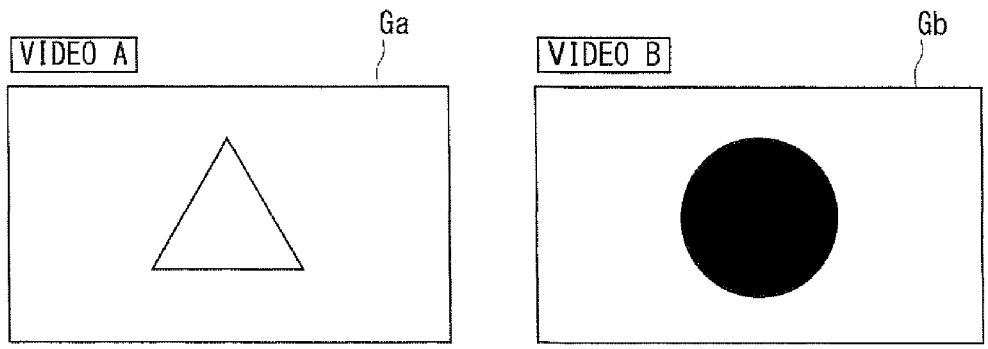
FIG. 9 includes schematic diagrams illustrating mixing video signals in a wipe mode.
Figure 9B:
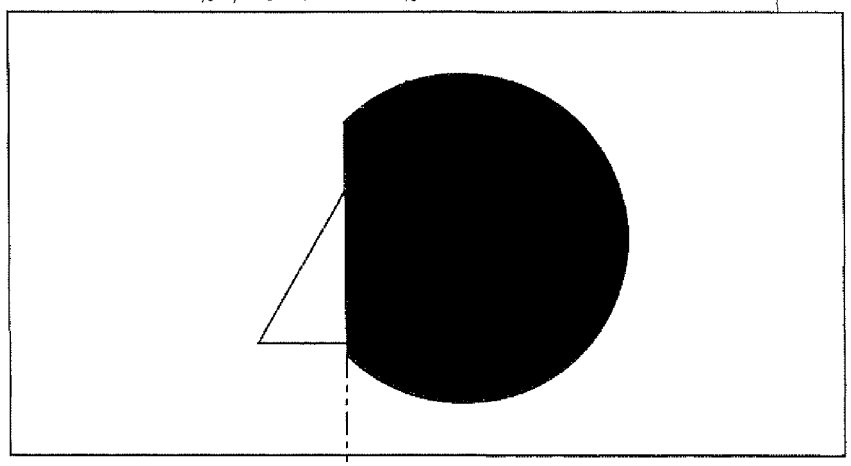
Figure 9C:
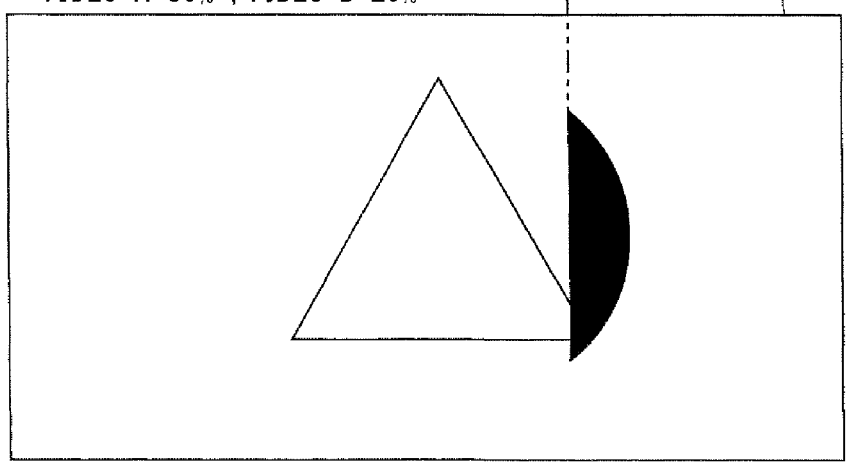

When video signals are mixed according to the above embodiment, they are mixed in the fader mode; however, they may be mixed in the wipe mode. FIG. 9 includes schematic diagrams illustrating mixing video signals in the wipe mode. Such video image A and video image B as shown in the FIG. 9A are displayed in the video image display regions Ga and Gb; when the video image A and video image B are mixed at the rate of twenty percent and eighty percent, respectively, the mixed video image display region Gm displays such mixed video images as shown in FIG. 9B. When the mixing rates of the video image A and video image B are changed to 80 percent and 20 percent, respectively, with the press point moved (dragged) under this situation, the mixed video image display region Gm displays such mixed video images as shown in the FIG. 9C. Accordingly, the mixing mode in which the video image A gradually changes from one side of the video image A to the video image B according to the mixing rate (wipe mode) may be applied to the invention.

While according to the above embodiment, the mixing rate of each audio signal is displayed in the border region G0 on the touch screen TP using a mix of the colors assigned to the respective audio signals, the mixing rates of video signals may be displayed using a mix of such colors.

When the mixing rate of each audio signal is displayed using a mix of colors, it is preferable that the color assigned to each audio signal be displayed near the end of the audio coordinate axis Za that indicates the maximum. This configuration enables a user to confirm the color assigned to each audio signal.

According to the above embodiment, the minimum and maximum of each coordinate axis are set to zero percent and one hundred percent, respectively; however, the minimum and maximum may be set to any percentage. A user may also be allowed to set the minimum and maximum for each coordinate axis Z to any percentage. With this configuration, the range of sound and video expression is expanded, and processing results closer to users' preference can be obtained.

According to the above embodiment, coordinate points are assigned using the touch screen TP; however, coordinate points may be assigned using a mouse or joystick. This means that various interfaces that are capable of assigning given coordinate points in a predetermined two-dimensional region may be applied.

Although DVJ equipment used in clubs or other venues is taken for an example of the AV processing device 30, the invention may also be applied to a device or program that is capable of inputting and blending a plurality of AV signals (e.g., audio/video mixers, audio/video controllers, audio/video processing applications). This means that the invention may be applied to any device that processes both audio signals and video signals, audio signals only, or video signals only.

Any part or function of the AV processing device 30 shown according to the above embodiment may be provided as a program. Such a program may be provided in a storage medium (not shown). As storage media, CD-ROM, flash ROM, memory cards (e.g., CompactFlash [registered trademark], SmartMedia, Memory Stick), Compact Discs, magneto-optical disks, digital versatile discs, flexible disks, hard disks or other storage media may be used.

Despite the above embodiment, appropriate changes and modifications to the system configuration of the AV processing device SY, the device configuration and processing processes of the AV processing device 30 and other part of the embodiment may be made without deviating from the scope of the invention.

The invention claimed is:

1. A mixing rate calculation device that calculates a mixing rate for each audio signal to mix and output the number of m audio signals (m is an integer filling a condition of m≧3) comprising:
   a coordinate point assigning unit that assigns a given coordinate point to the number of m audio signals in a region where the number of m coordinate axes indicating from a minimum value to a maximum value of the mixing rate are virtually assigned; and
   a mixing rate calculator that calculates a mixing rate of each of the audio signals based on a coordinate axis of each of the audio signals and the assigned coordinate point.

2. The mixing rate calculation device according to claim 1, wherein at least two coordinate axes in the number of m coordinate axes are formed by a line segment in which a maximum value of one audio signal and a minimum value of the other audio signal coincide and a minimum value of the one audio signal and a maximum value of the other audio signal coincide, and the device further has a switching unit that switches positions of the maximum value and the minimum value of the one audio signal and positions of the maximum value and the minimum value of the other audio signal simultaneously.

3. The mixing rate calculation device according to claim 1 further having a display unit that displays a coordinate position assigned by the coordinate position assigning unit in the region.

4. The mixing rate calculation device according to claim 1, wherein at least two coordinate axes in the number of m coordinate axes are assigned in the region having a predetermined angle.

5. A non-transitory computer readable medium having a computer program stored thereon which, when executed by a computer processor, causes a computer to operate each unit of the mixing rate calculation device described in claim 1.

6. A mixing rate calculation device that calculates a mixing rate for each video signal to mix and output the number of n video signals (n is an integer filling a condition of n≧3) comprising:
   a coordinate point assigning unit that assigns a given coordinate point to the number of n video signals in a region where the number of n coordinate axes indicating from a minimum value to a maximum value of the mixing rate are virtually assigned; and
   a mixing rate calculator that calculates a mixing rate of each of the video signals based on a coordinate axis of each of the video signals and the assigned coordinate point.

7. A non-transitory computer readable medium having a computer program stored thereon which, when executed by a computer processor, causes a computer to operate each unit of the mixing rate calculation device described in claim 6.

8. A mixing rate calculation device that calculates a mixing rate for each AV signal to mix and output the number of l AV signals (l is an integer filling a condition of l=m+n≧3) including the number of m audio signals (m is an integer filling a condition of m≧0) and the number of n video signals (n is an integer filling a condition of n≧0) comprising:
   a coordinate point assigning unit that assigns a given coordinate point to the number of l AV signals in a region where the number of l coordinate axes indicating from a minimum value to a maximum value of the mixing rate are virtually assigned on a touch panel;
   a video image display unit that displays a video image of the video signal corresponding to the coordinate axis around an end of a maximum value of the coordinate axis on the touch panel when the AV signal is the video image signal; and
   a mixing rate calculation unit that calculates a mixing ratio of each of the AV signals based on a coordinate axis of each of the AV signals and the assigned coordinate point.

9. A non-transitory computer readable medium having a computer program stored thereon which, when executed by a computer processor, causes a computer to operate each unit of the mixing rate calculation device described in claim 8.

10. A mixing rate calculation device that calculates a mixing rate for each AV signal to mix and output the number of l AV signals (l is an integer filling a condition of l=m+n≧3) including the number of m audio signals (m is an integer filling a condition of m≧0) and the number of n video signals (n is an integer filling a condition of n≧0) comprising:
    a coordinate point assigning unit that assigns a given coordinate point to the number of l AV signals in a region where the number of l coordinate axes indicating from a minimum value to a maximum value of the mixing rate are virtually assigned on a touch panel;
    a mixing rate calculator that calculates a mixing rate of each of the AV signals based on a coordinate axis of each of the AV signals and the assigned coordinate point; and
    a mixing rate display unit that displays a mixing rate calculated by the mixing rate calculator as a mix of colors assigned to each of the AV signals on the touch panel.

11. A non-transitory computer readable medium having a computer program stored thereon which, when executed by a computer processor, causes a computer to operate each unit of the mixing rate calculation device described in claim 10.

12. A mixing rate calculation device that calculates a mixing rate for each AV signal to mix and output the number of l AV signals (l is an integer filling a condition of l=m+n≧3) including the number of m audio signals (m is an integer filling a condition of m≧0) and the number of n video signals (n is an integer filling a condition of n≧0) comprising:
- a coordinate point assigning unit that assigns a given coordinate point to the number of 1 AV signals in a region where the number of 1 coordinate axes indicating from a minimum value to a maximum value of the mixing rate are virtually assigned on a touch panel;
- a mixing rate calculator that calculates a mixing rate of each of the AV signals based on a coordinate axis of each of the AV signals and the assigned coordinate point; and
- a mixed video image display unit that displays a video image of a mixed video signal in which the number of n video signals are mixed on the touch panel.

13. A non-transitory computer readable medium having a computer program stored thereon which, when executed by a computer processor, causes a computer to operate each unit of the mixing rate calculation device described in claim 12.

14. A method of calculating a mixing rate for each audio signal to mix and output the number of m audio signals (m is an integer filling a condition of m≧3) comprising steps of:
- obtaining a point information when a given coordinate point is assigned to the number of m audio signals in a region where the number of m coordinate axes indicating from a minimum value to a maximum value of the mixing rate are virtually assigned; and
- calculating a mixing rate of each of the audio signals based on a coordinate axis of each of the audio signals and point information corresponding to the assigned coordinate point.

15. A method of calculating a mixing rate for each video signal to mix and output the number of n audio signals (n is an integer filling a condition of n≧3) comprising steps of:
- obtaining a point information when a given coordinate point is assigned to the number of n video signals in a region where the number of n coordinate axes indicating from a minimum value to a maximum value of the mixing rate are virtually assigned; and
- calculating a mixing rate of each of the video signals based on a coordinate axis of each of the video signals and point information corresponding to the assigned coordinate point.

* * * * *